(12) United States Patent
Hong et al.

(10) Patent No.: US 9,758,695 B2
(45) Date of Patent: Sep. 12, 2017

(54) MULTILAYER CERAMIC CAPACITOR HAVING A MOISTURE RESISTANT PROTECTIVE FILM

(71) Applicant: SAMSUNG ELECTRO-MECHANICS CO., LTD., Suwon-Si, Gyeonggi-Do (KR)

(72) Inventors: Kyung Pyo Hong, Suwon-Si (KR); Young Bae Kil, Yongin-si (KR); Sang Hyun Park, Suwon-Si (KR); Hae Suk Chung, Seoul (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 55 days.

(21) Appl. No.: 14/817,940

(22) Filed: Aug. 4, 2015

(65) Prior Publication Data
US 2016/0042864 A1 Feb. 11, 2016

(30) Foreign Application Priority Data

Aug. 5, 2014 (KR) .......................... 10-2014-0100438

(51) Int. Cl.
| | | |
|---|---|---|
| *C09D 183/06* | (2006.01) | |
| *H01G 4/30* | (2006.01) | |
| *H01G 4/224* | (2006.01) | |
| *H01G 4/232* | (2006.01) | |
| *C08G 77/14* | (2006.01) | |

(52) U.S. Cl.
CPC .......... *C09D 183/06* (2013.01); *H01G 4/224* (2013.01); *H01G 4/232* (2013.01); *H01G 4/30* (2013.01); *C08G 77/14* (2013.01)

(58) Field of Classification Search
CPC ...... C09D 183/06; H01G 4/232; H01G 4/224; H01G 4/30; C08G 77/14
See application file for complete search history.

(56) References Cited

U.S. PATENT DOCUMENTS

| | | | | |
|---|---|---|---|---|
| 6,721,166 | B2 * | 4/2004 | Takahara | H01G 4/12 361/303 |
| 7,005,192 | B2 † | 2/2006 | Sanada | |
| 8,871,601 | B2 * | 10/2014 | Zhang | B82Y 30/00 257/40 |
| 2003/0134133 | A1 † | 7/2003 | Kimura | |
| 2006/0180899 | A1 * | 8/2006 | Ko | H01C 1/028 257/634 |
| 2008/0151470 | A1 * | 6/2008 | Motoki | H01G 4/0085 361/303 |
| 2010/0302704 | A1 † | 12/2010 | Ogawa | |
| 2011/0193448 | A1 * | 8/2011 | Saruban | H01G 4/005 310/311 |

FOREIGN PATENT DOCUMENTS

| | | |
|---|---|---|
| JP | 6-42478 A | 2/1994 |
| JP | 10116706 A * | 5/1998 |

\* cited by examiner
† cited by third party

*Primary Examiner* — David M Sinclair
(74) *Attorney, Agent, or Firm* — McDermott Will & Emery LLP

(57) ABSTRACT

Disclosed herein is a multilayer ceramic capacitor including: a ceramic body in which internal electrodes and dielectric layers are alternately stacked; a pair of external electrodes covering both end portions of the ceramic body; and a moisture resistant protective film formed on surfaces of the dielectric layers between the pair of external electrodes and having a hydrophobic functional group.

10 Claims, 3 Drawing Sheets

FIG. 3 - PRIOR ART
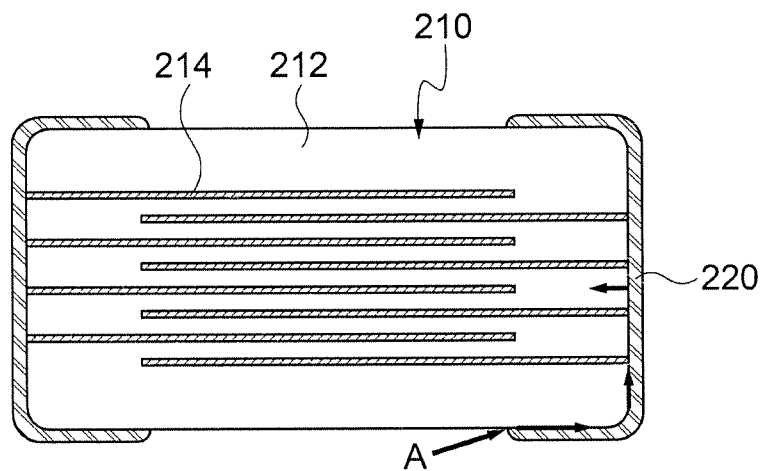
FIG. 4
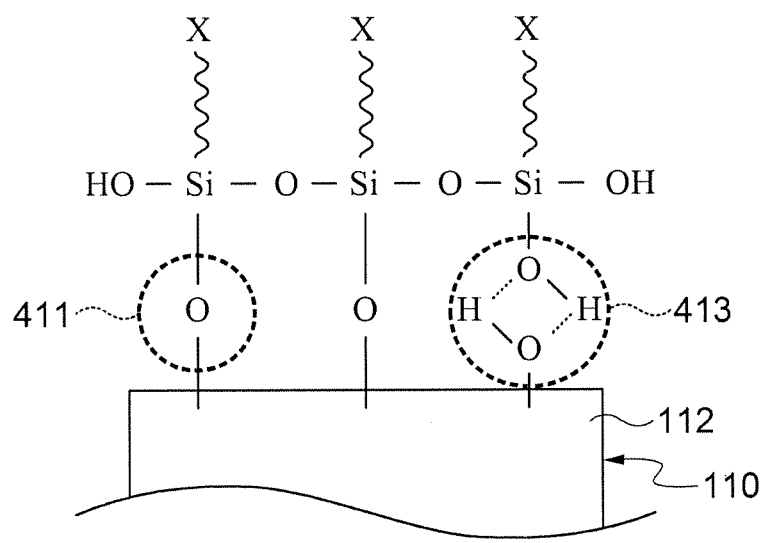

MULTILAYER CERAMIC CAPACITOR HAVING A MOISTURE RESISTANT PROTECTIVE FILM

This application claims the benefit under 35 U.S.C. Section [120, 119, 119(e)] of Korean Patent Application Serial No. 10-2014-0100438, entitled "Multilayer Ceramic Capacitor" filed on Aug. 5, 2014, which is hereby incorporated by reference in its entirety into this application.

BACKGROUND

1. Technical Field

The present disclosure relates to a multilayer ceramic capacitor.

2. Description of the Related Art

In general, electronic components using a ceramic material, such as a capacitor, an inductor, a piezoelectric element, or the like, include a ceramic body made of a ceramic material, internal electrodes formed in the ceramic body, and external terminals formed on a surface of the ceramic body so as to be connected to the internal electrodes.

Among the ceramic electronic components, a multilayer ceramic capacitor (MLCC) is configured to include a plurality of ceramic dielectric sheets, internal electrodes inserted between the plurality of ceramic dielectric sheets, and external electrodes electrically connected to the internal electrodes.

This multilayer ceramic capacitor may have a small size, implement high capacitance and be easily mounted on a board, such that the multilayer ceramic capacitor has been widely used as a capacitive component of various electronic devices.

Recently, as the multilayer ceramic capacitor has been used under severe conditions high capacitance and high voltage, reliability at a high temperature and high humidity, that is, temperature-humidity-bias characteristics has been required.

SUMMARY

An object of the present disclosure is to provide a multilayer ceramic capacitor capable of improving moisture resistance at a bonding site between different members of the multilayer ceramic capacitor.

In a multilayer ceramic capacitor including external electrodes formed on both end portions of a ceramic body in which dielectric layers are stacked, the dielectric layers and the external electrodes being made of different materials, an object of the multilayer ceramic capacitor according to an exemplary embodiment of the present disclosure is to prevent moisture infiltration in a bonding site between different materials of the external electrodes and the dielectric layers.

To this end, a moisture resistant protective film modifying surfaces of the dielectric layers having a hydroxyl group (—OH) into hydrophobic surfaces is interposed on surfaces of the dielectric layers exposed between a pair of external electrodes, such that moisture infiltration generated in bonding sites between the dielectric layers and the external electrodes may be suppressed.

BRIEF DESCRIPTION OF DRAWINGS

FIG. 3 is a view illustrating moisture infiltration paths of a multilayer ceramic capacitor according to the related art.

FIG. 4 is a view illustrating a state in which a moisture resistant protective film of FIG. 2 is bonded to a surface of a dielectric layer formed in a ceramic body.

DESCRIPTION OF EMBODIMENT(S)

Figure 1:
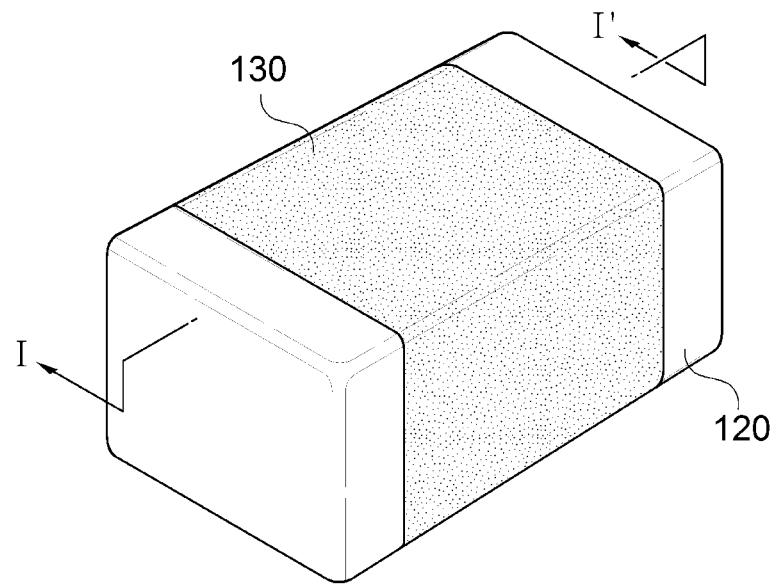
FIG. 1 is a perspective diagram illustrating a multilayer ceramic capacitor according to an exemplary embodiment of the present disclosure.

Hereinafter, exemplary embodiments will be described in detail with reference to the accompanying drawings so that they can be easily practiced by those skilled in the art to which the present disclosure pertains. However, in describing exemplary embodiments of the present disclosure, detailed descriptions of well-known functions or constructions will be omitted so as not to obscure the description of the present disclosure with unnecessary detail.

In addition, like reference numerals denote parts performing similar functions and actions throughout the drawings.

A case in which any one part is connected with the other part includes a case in which the parts are directly connected with each other and a case in which the parts are indirectly connected with each other with other elements interposed therebetween.

In addition, unless explicitly described otherwise, "comprising" any components will be understood to imply the inclusion of other components but not the exclusion of any other components.

As a result, the technical spirit of the present disclosure is determined by the claims and the following exemplary embodiments may be provided to efficiently describe the spirit of the present disclosure to those skilled in the art.

Hereinafter, a multilayer ceramic capacitor according to an exemplary embodiment of the present disclosure and a manufacturing method thereof will be described with reference to FIGS. 1 to 5.

Figure 2:
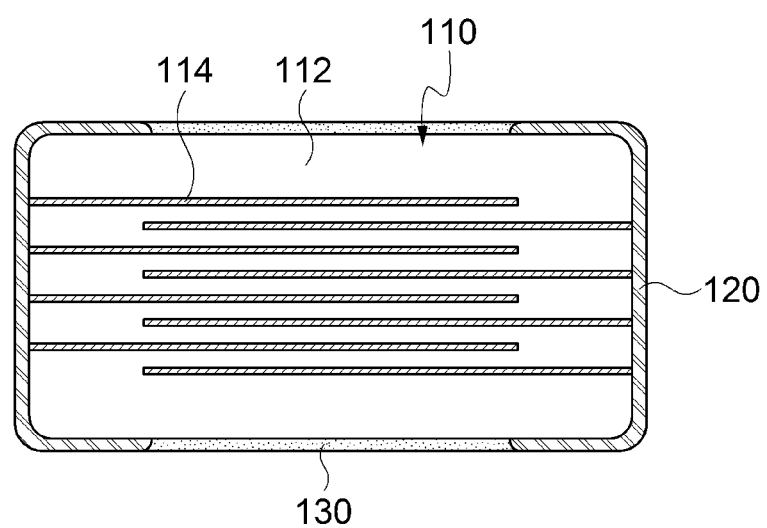
FIG. 2 is a cross-sectional view taken along line I-I' of FIG. 1.

FIG. 1 is a perspective diagram illustrating a multilayer ceramic capacitor according to an exemplary embodiment of the present disclosure, FIG. 2 is a cross-sectional view taken along line I-I' of FIG. 1, and FIG. 3 is a view illustrating moisture infiltration paths of a multilayer ceramic capacitor according to the related art.

Referring to FIGS. 1 and 2, the multilayer ceramic capacitor 100 according to an exemplary embodiment of the present disclosure may include a ceramic body 110, external electrodes 120, and moisture resistant protective film 130.

The ceramic body 110 according to the present disclosure is formed by stacking a plurality of dielectric layers 112 therein and inserting internal electrodes 114 between the plurality of dielectric layers 112.

In this case, the dielectric layer 112 is a ceramic dielectric layer made of a general ceramic material such as barium titanate ($BaTiO_3$), or the like, and is a ceramic dielectric sheet manufactured in a plate shaped sheet form.

The ceramic body 110 is completed in a box shape by a sintering process after stacking and compressing a plurality of ceramic sheets made of a ferrodielectric material such as $BaTiO_3$, and adjacent ceramic sheets are integrated with each other so that boundaries therebetween are not readily apparent. Therefore, the ceramic sheets are integrally illustrated without distinguishing each of the ceramic sheets in the accompanying drawings.

The internal electrodes 114 according to the present disclosure are interposed between the plurality of dielectric layers, and positive and negative electrodes are alternately disposed.

In this case, the ceramic body 110 may be formed by alternatively stacking a first ceramic sheet (not illustrated) on which the internal electrode 114 is formed so that one end thereof is exposed to the outside and a second ceramic sheet (not illustrated) on which the internal electrode 114 is formed so that the other end thereof opposite to one end is exposed to the outside and then sintering the stacked first and second ceramic sheets.

That is, the ceramic body 110 may be formed by stacking a plurality of ceramic sheets on which the internal electrodes are printed so that directions of exposed ends thereof between the layers are different from each other. However, a structure of the ceramic body 110 is not necessarily limited thereto.

The internal electrode 114 may contain a conductive material, for example, one or more metals selected from nickel (Ni), palladium (Pd), aluminum (Al), iron (Fe), copper (Cu), titanium (Ti), chromium (Cr), gold (Au), silver (Ag), platinum (Pt), and the like, or an alloy thereof.

The internal electrode 114 may be formed of a metal thin film sintered through a sintering process after applying a conductive paste, for example, a metal paste on one surface of the ceramic sheet.

The external electrodes 120 of the present disclosure are formed on the ceramic body 110 so as to cover both end portions of the ceramic body 110.

The external electrodes 120 may serve external terminals connected to the internal electrodes 114 of which distal ends thereof are exposed to the outside of the ceramic body 110 to electrically connect the internal electrodes 114 and an external element to each other.

In a pair of external electrodes 120, any one is connected to the internal electrode 114 of which one end is exposed to the outside of the ceramic body 110, and the other is connected to the internal electrode 114 of which the other end is exposed to the outside of the ceramic body 110.

As an example, the internal electrode 114 connected to the external electrode 120 formed on one side of the ceramic body 110 may be an anode and the internal electrode 114 connected to the external electrode 120 formed on the other side of the ceramic body 110 may be a cathode.

The external electrodes 120 as described above may contain a conductive material, for example, one or more metals selected from copper (Cu), silver (Ag), and platinum (Pt), or an alloy thereof.

The external electrodes 120 may be formed through a sintering process at a temperature of 700° C. to 900° C. after plating so as to cover both end portions of the ceramic body 110 using a dipping method.

The external electrodes 120 may be formed as a multilayer including nickel (Ni) plating layers, tin (Sn) plating layers, or the like, formed by an electroplating or electroless plating method, or the like, for solderability and corrosion resistance.

In a multilayer ceramic capacitor according to the related art, a short caused by moisture infiltration may be prevented by densely implementing external electrodes or increasing a thickness of the external electrodes.

However, recently, as the multilayer ceramic capacitor has been used under severe usage conditions high capacitance and high voltage, it is difficult to guarantee temperature-humidity-bias test only by controlling the external electrodes.

As illustrated in FIG. 3, a multilayer ceramic capacitor 200 according to the related art does not resist moisture load at bonding sites between dielectric layers 212 of a ceramic body 210 and external electrodes 220, such that a moisture infiltration path in an A arrow direction (→) is shown.

As described above, a short due to moisture infiltrated into internal electrodes 214 along bonding surfaces between the ceramic body 210 and the external electrodes 220 acts as a cause of deteriorating reliability of a product, for example, generating electric property disorder in a component, or the like.

Therefore, according to the present disclosure, a moisture resistant protective film is introduced in order to improve moisture resistance at the bonding sites between the dielectric layers and the external electrodes of the multilayer ceramic capacitor under severe environments of high temperature and high humidity, a description thereof will be provided below.

Referring to FIGS. 1 and 2 again, the moisture resistant protective film 130 according to the present disclosure is formed in order to improve temperature-humidity-bias characteristics at the bonding site of the ceramic body 110 of a chip type multilayer ceramic capacitor 100 and the external electrodes 120, that is, bonding surfaces between the dielectric layers 112 and the external electrodes 120.

That is, the moisture resistant protective film 130 is a coating layer serving as a sealing layer for blocking moisture infiltration at the bonding sides between the dielectric layers 112 and the external electrodes 120 under high temperature and high humidity environments.

To this end, the moisture resistant protective film 130 according to the present disclosure is formed on exposed surfaces of the dielectric layers 112 between the pair of external electrodes 120 formed on both end portions.

The moisture resistant protective film 130 as described above is a surface modified coating layer containing a material having a hydrophobic functional group to modify the exposed surfaces of the dielectric layer 112 into hydrophobic surfaces.

As an example, the moisture resistant protective film 130 may be made of a silane based compound using a silane coupling agent. In this case, in the moisture resistant protective film 130, one terminal of a silicon (Si) atom is covalent- or hydrogen-bonded to the surface of the dielectric layer 112, and another terminal of the silicon (Si) atom is bonded to the hydrophobic functional group.

The silane coupling agent may be prepared from a material simultaneously having a hydrophilic functional group and a hydrophobic functional group according to a raw material, and since bonding strength between the hydrophilic functional group of the silane coupling agent and ceramic is stronger than bonding strength between the hydrophilic functional group of the silane coupling agent and a metal, the silane coupling agent is not suitably coated on the metal.

Therefore, when the moisture resistant protective film 130 is formed using the silane coupling agent, the silane coupling agent is not suitably coated on the external electrodes 120 but may be selectively coated on only the surfaces of the dielectric layers 112, such that a subsequent reflow soldering is not affected.

More specifically, the silane coupling agent has two functional groups of which reactivities are different from each other, that is, the hydrophilic functional group and the hydrophobic functional group in one molecule and may be represented by the following [Chemical Formula 1].

   [Chemical Formula 1]

(Here, $R_3$ indicates a hydrolyzable hydrophilic functional group, and X indicates a nonhydrolyzable hydrophobic functional group.)

As an example, $R_3$, which is a material chemically bonded to an inorganic material, may be an alkoxy group (R—O) such as a methoxy group ($CH_3O$—), an ethoxy group ($C_2H_5O$—), or the like.

As an example, X may be an epoxy group, a vinyl group ($CH_2CH$—), an amino group (—$NH_2$), a methacrylic group, a mercapto group (SH—), or the like, but is not limited thereto.

As an example of the silane coupling agent, 3-glycidoxypropyltrimethoxysilane (GPTMS), 3-glycidoxypropyltriethoxysilane (GPTES), vinyltrimethoxysilane, vinyltriethoxysilane, 3-aminopropyltrimethoxysilane (APTMS), 3-aminopropyltriethoxysilane, 3-methacryloxypropyltrimethoxysilane, 3-methacryloxypropyltriethoxysilane, 3-mercaptopropyltrimethoxysilane, or the like, may be mainly used, but the present disclosure is not particularly limited thereto. One or a mixture of two or more of these silane coupling agent may be used.

As the silane coupling agent, 3-glycidoxypropyltrimethoxysilane (GPTMS) having excellent hydrolysis performance due to an organic group that is not bulk may be more preferable.

moisture resistant protective film 130 is less than 0.25 g/m$^2$, a close adhesion property to the dielectric layer is deteriorated, such that it may be difficult to improve moisture resistance. Further, in the case in which the weight/thickness (in terms of silicon atom) of the moisture resistant protective film 130 is more than 30.0 g/m$^2$, the close adhesion property is not improved any more, but only a manufacturing cost may be increased.

Thereinafter, the moisture resistant protective film 130 formed of a silane compound will be described in detail.

FIG. 4 is a view illustrating a state in which the moisture resistant protective film of FIG. 2 is bonded to the surface of the dielectric layer formed in the ceramic body.

The moisture resistant protective film 130 (see FIG. 2) is composed of a hydrophobic silane compound in which one terminal of a Si atom is covalent-bonded (411) or hydrogen-bonded (413) to the surface of the dielectric layer 112 and another terminal of the Si atom is bonded to the hydrophobic functional group X as illustrated in FIG. 4.

The moisture resistant protective film 130 as described above (see FIG. 2) is a self-assembled monomers (SAMs) film formed according to reaction mechanism of the following [Reaction Formula 1]. The reaction mechanism of a formation process of the moisture resistant protective film 130 (see FIG. 2) by a self-assembled monomer process will be described with reference to the following [Reaction Formula 1].

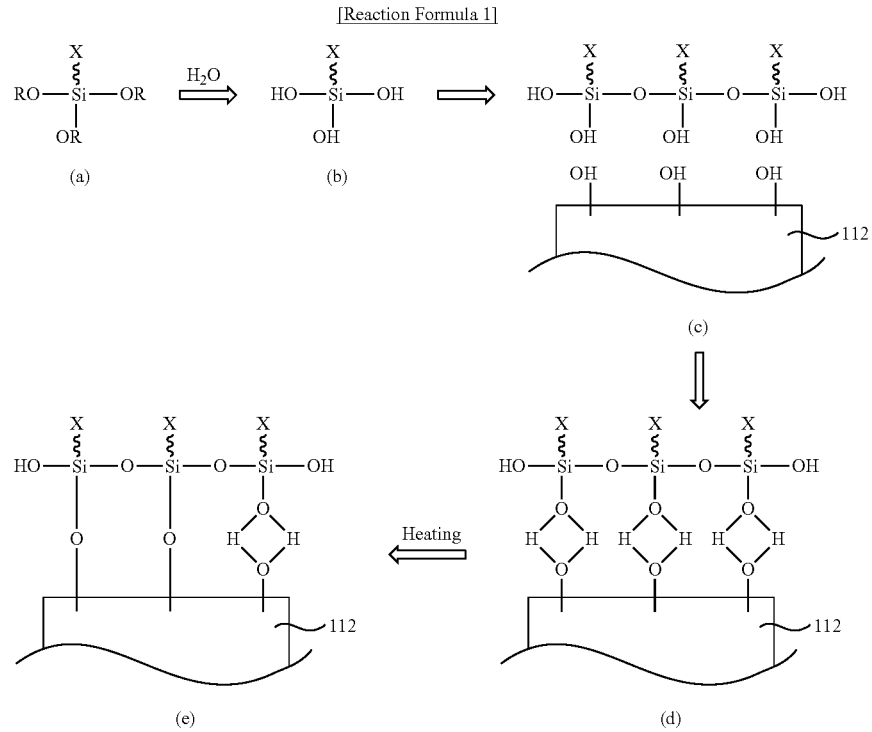

[Reaction Formula 1]

It is preferable that the moisture resistant protective film 130 according to the present disclosure is formed to have a weight/thickness range of 0.25 g/m$^2$ to 30.0 g/m$^2$, preferably 0.5 g/m$^2$ to 2.0 g/m$^2$ in terms of silicon atom. In the case in which the weight/thickness (in terms of silicon atom) of the First, a silane coupling agent in which a single hydrophobic function group X is bonded to one terminal of a Si atom, and alkoxy groups (OR) are bonded to the other three terminals of the Si atom is prepared as a starting material (step (a)).

Then, the prepared silane coupling agent is dissolved in water ($H_2O$). In this process, the alkoxy group (Si—OR) of the silane coupling agent is hydrolyzed by water ($H_2O$) to thereby be converted into a silanol group (Si—OH) (step (b)), which causes a siloxane linkage (—Si—O—Si—) (step (c)). At this time, in step (c), a ceramic body provided with the dielectric layer 112 of which the surface has a hydroxyl group (—OH) may be dipped in a siloxane compound solution.

As a result, the hydroxyl group (—OH) of the surface of the dielectric layer 112 and the silanol group (Si—OH) of the siloxane compound are self-assembled to form a hydrogen bond (step (d)), and a covalent bond via oxygen is formed while a dehydration condensation reaction is carried out by heating (step (e)).

Meanwhile, the ceramic body of which the external electrodes are formed on both end portions may be dipped in the siloxane compound solution in step (d), and in step (d), a heating process may be further performed in order to increase a reaction rate.

The surface of the dielectric layer 112 having a hydrophilic property is modified into a hydrophobic surface by the moisture resistant protective film 130 (see FIG. 2) coated on the surface of the dielectric layer 112 according to the reaction mechanism as described above.

As illustrated in FIG. 2, when the moisture resistant protective film 130 having the hydrophobic functional group is interposed on the surface of the dielectric layer 112 between the pair of external electrodes 120, moisture infiltration at the bonding surfaces between the dielectric layers 112 and the external electrodes 120 is suppressed by the moisture resistant protective film 130 having a low affinity to moisture, such that temperature-humidity-bias characteristic of the element under high temperature and high humidity environments may be improved.

Hereinafter, a manufacturing method of the moisture resistant protective film using the self-assembled monomer process suggested in [Reaction Formula 1] will be described in detail.

First, after the above-mentioned silane coupling agent is prepared (step (a)), and the silane coupling agent is dissolved in a solvent (step (b)).

The silane coupling agent is dissolved in the solvent and then used, and as the solvent, water ($H_2O$), or an organic solvent such as ethanol ($C_2H_5OH$), methanol ($CH_3OH$), methylethylketone ($CH_3COC_2H_5$), benzene ($C_6H_6$), or the like, may be used, but the present disclosure is not limited thereto. One or a mixture of two or more of these solvents may be used.

The silane coupling agent is dissolved in water or the organic solvent at a concentration of 1 to 10% and then used. The silane coupling agent forms a coating film by a condensation linkage with the OH group in the surface of the dielectric layer, and even in the case of using a highly concentrated solution, the effect is not significantly increased. In the case in which the concentration of the silane coupling agent solution is less than 1%, an adsorption rate of the silane coupling agent is slow, and adsorption may be non-uniformly performed, but in the case in which the concentration is more than 10%, the silane coupling agent is polymerized, such that white turbidity may be easily generated, and a deviation in performance is also increased.

Further, the silane coupling agent solution may be prepared by stirring at a rate of 100 to 400 rpm for 1 to 3 hours using a stirrer such as a magnetic bar (step (c)).

In step (b), the alkoxy group of the silane coupling agent is hydrolyzed by the solvent to thereby be converted into the silanol group (Si—OH), and in step (c), the siloxane compound solution having the siloxane bond (—Si—O—Si—) is prepared.

Then, the hydrogen bond is formed by heating the siloxane compound solution at a temperature of 40° C. to 80° C. to self-assemble the hydroxyl group (—OH) of the surface of the dielectric layer 112 of the dipped chip and the silanol group (Si—OH) of the siloxane compound (step (d)).

Subsequently, the chip on which formation of a silane coating layer is terminated is washed with pure water three to ten times at room temperature (25° C.) and dried at room temperature (25° C.) for 10 to 15 hours, thereby removing moisture in a surface of the chip. The dried chip is heat-treated at 100° C. to 150° C. for 10 minutes to 1 hour (step (e)). When the dried chip is heat-treated in step (e), the dehydration condensation reaction is carried out, such that the silane coating layer is firmly bonded to the surface of the dielectric layer.

EXAMPLE

Hereinafter, configurations and effects of the present disclosure will be described in more detail through preferable Examples of the present disclosure. However, the Examples are provided as preferable examples, and the present disclosure is not limited thereto.

Since contents that are not described in the present specification may be sufficiently recognized and inferred by those skilled in the art, a description thereof will be omitted.

1. Preparation of Sample

Example 1

98 g of pure water and 2 g of 3-glycidoxypropyl trimethoxysilane (KBM-403, Shin-Etsu, Japan) were mixed with each other in a beaker to prepare a KBM-403 solution, and then stirred at 25° C. and 250 rpm for 2 hours using a magnetic bar, thereby preparing a coating solution.

Thereafter, after 100 g of the coating solution was heated to 60° C., and 300 chips were dipped in the coating solution for 1 hour, thereby coating silane on surfaces of the chips.

Next, the chips coated with silane were washed with pure water five times and dried at room temperature (25° C.) for 12 hours, followed by heat treatment at 120° C. for 30 minutes.

Process conditions of Example 1 were illustrated in the following Table 1.

In this case, as the chip, a general multilayer ceramic capacitor in which external electrodes are formed on both end portions of a ceramic body was used.

TABLE 1

| Classification | | Condition |
|---|---|---|
| Preparation of Coating Solution | Pure Water | 98 g |
| | 3-Glycidoxypropyl trimethoxysilane | 2 g |
| | Concentration | 2% |
| | Temperature | Room Temperature (25° C.) |
| | Time | 2 Hours |
| | Stirring Rate | 250 rpm |
| Coating | The Number of Dipped Chips | 300EA |
| | Coating Solution | 100 g |
| | Temperature | 60° C. |
| | Time | 1 Hour |
| Washing | Pure Water | 5 Times |
| | Temperature | Room Temperature (25° C.) |

TABLE 1-continued

| Classification | Condition | |
| --- | --- | --- |
| Drying | Time | 12 Hours |
| | Temperature | Room Temperature (25° C.) |
| Heat Treatment | Temperature | 120° C. |
| | Time | 30 Minutes |

Comparative Example 1

A general multilayer ceramic capacitor on which a silane coating layer was not formed was used.

As the multilayer ceramic capacitors in Example 1 and Comparative Example 1, multilayer ceramic capacitors (220, 16V, Model Name: 32B226KOJVPN) having a 3225 size (3.2 mm×2.5 mm×2.5 mm) were used.

2. Evaluation of Physical Properties

Figure 5:
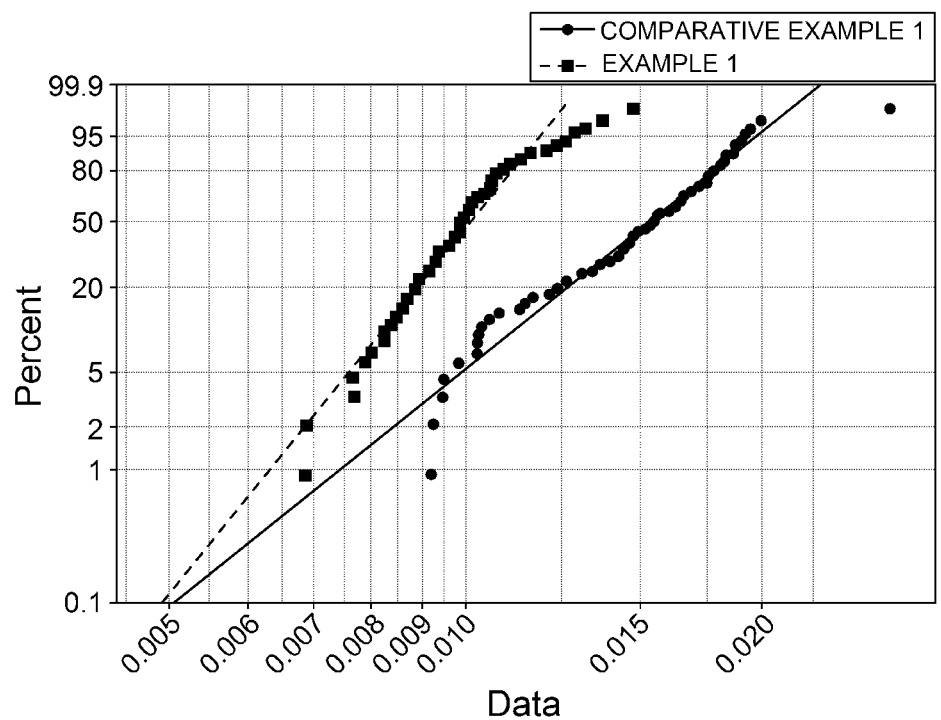
FIG. 5 is a graph illustrating results of a temperature-humidity-bias test in Example 1 and Comparative Example 1 of the present disclosure.

Results of temperature-humidity-bias test of the multilayer ceramic capacitors in Example 1 and Comparative Example 1 were illustrated in Table 2, and measurement results of dissipation factor (DF) properties of the chips of which the of temperature-humidity-bias test was terminated were illustrated in FIG. 5.

Here, the of temperature-humidity-bias test was measured under the conditions (temperature, humidity, time, voltage, and the number of chips) described in Table 2.

Further, the DF properties were measured using Agilent LCR meter 4288A at 1 kHz and 1 Vrms.

TABLE 2

| Classification | Conditions | Result |
| --- | --- | --- |
| Comparative Example 1 | 85° C., 85%, 340 hr, 16 V, 80EA | NG |
| Example 1 | | OK |

<Judgment Standard>

NG (No Good): One or more specs of capacitance, DF, and insulation resistance (IR) is unsatisfactory, OK (Good): All of the three specs (capacitance, DF, and IR) are satisfactory.

Referring to Table 2, it may be confirmed that in Comparative Example 1 in which the silane coating layer was not formed, a moisture resistance defect occurred, but in Example 1 in which the silane coating layer was formed, all the specs were good without moisture resistance defect.

Referring to FIG. 5, as the results obtained by measuring the DF properties of the chips of which the temperature-humidity-bias test was terminated, it may be appreciated that that in Comparative Example 1 in which the silane coating layer was not formed, an increase in DF due to moisture infiltration was observed, but in Example 1 in which the silane coating layer was formed, there was no change in DF. Therefore, it may be appreciated that in Example 1 in which the silane coating layer was formed, there was no dielectric loss.

As described above, when the hydrophobic silane coating layer is interposed on the exposed surfaces of the dielectric layers between the external electrodes of the multilayer ceramic capacitor, moisture infiltration into the chip under high temperature and high humidity environments may be suppressed, thereby making it possible to prevent reliability of the product from being deteriorated.

As set forth above, according to exemplary embodiments of the present disclosure, the multilayer ceramic capacitor capable of improving reliability of the product under high temperature and high humidity environments by improving temperature-humidity-bias characteristic at the bonding site between the different members of the chip may be provided.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. A multilayer ceramic capacitor comprising:
   a ceramic body in which internal electrodes and dielectric layers are alternately stacked;
   a pair of external electrodes covering both end portions of the ceramic body; and
   a moisture resistant protective film formed on surfaces of the dielectric layers between the pair of external electrodes and having a hydrophobic functional group,
   wherein the moisture resistant protective film is made of a silane based compound, and
   the moisture resistant protective film is formed to have a weight/thickness range of 0.25 g/m² to 30.0 g/m² in terms of a silicon atom.

2. The multilayer ceramic capacitor according to claim 1, wherein the silane based compound is formed by hydrolysis and dehydration condensation reaction of a silane coupling agent represented by the following [Chemical Formula 1]:

$$X\text{—}Si\text{—}R_3 \qquad \text{[Chemical Formula 1]}$$

(here, $R_3$ indicates a hydrolyzable hydrophilic functional group, and X indicates a nonhydrolyzable hydrophobic functional group).

3. The multilayer ceramic capacitor according to claim 2, wherein the hydrolyzable hydrophilic functional group of the silane coupling agent is an alkoxy group (R—O).

4. The multilayer ceramic capacitor according to claim 3, wherein in the silane based compound, one terminal of a silicon (Si) atom is covalent- or hydrogen-bonded to the surface of the dielectric layer, and another terminal of the silicon (Si) atom is bonded to the hydrophobic functional group.

5. The multilayer ceramic capacitor according to claim 4, wherein the moisture resistant protective film has a covalent bond formed through dehydration condensation by heating after a hydroxyl group (—OH) of the surface of the dielectric layer and a silanol group (Si—OH) of a siloxane compound formed by hydrolysis of the silane coupling agent are self-assembled to thereby be hydrogen-bonded to each other.

6. The multilayer ceramic capacitor according to claim 2, wherein the nonhydrolyzable hydrophobic functional group of the silane coupling agent is one or more selected from an epoxy group, a vinyl group ($CH_2CH\text{—}$), an amino group ($\text{—}NH_2$), a methacrylic group, and a mercapto group (SH—).

7. The multilayer ceramic capacitor according to claim 4, wherein in the silane based compound, one terminal of a silicon (Si) atom is covalent- or hydrogen-bonded to the surface of the dielectric layer, and another terminal of the silicon (Si) atom is bonded to the hydrophobic functional group.

8. The multilayer ceramic capacitor according to claim 7, wherein the moisture resistant protective film has a covalent bond formed through dehydration condensation by heating after a hydroxyl group (—OH) of the surface of the dielectric layer and a silanol group (Si—OH) of a siloxane compound formed by hydrolysis of the silane coupling agent are self-assembled to thereby be hydrogen-bonded to each other.

9. The multilayer ceramic capacitor according to claim 2, wherein the silane coupling agent is one or more selected from 3-glycidoxypropyltrimethoxysilane, 3-glycidoxypropyltriethoxysilane, vinyltrimethoxsilane, vinyltriethoxysilane, 3-aminopropyltrimethoxysilane, 3-aminopropyltriethoxysilane, 3-methacryloxypropyltrimethoxysilane, 3-methacryloxypropyltriethoxysilane, and 3-mercaptopropyltrimethoxysilane.

10. The multilayer ceramic capacitor according to claim 1, wherein the moisture resistant protective film is a self-assembled monomers (SAMs) film.

* * * * *